July 9, 1968     M. L. SEVERSON     3,391,763
BRAKE DISK
Filed Feb. 14, 1967
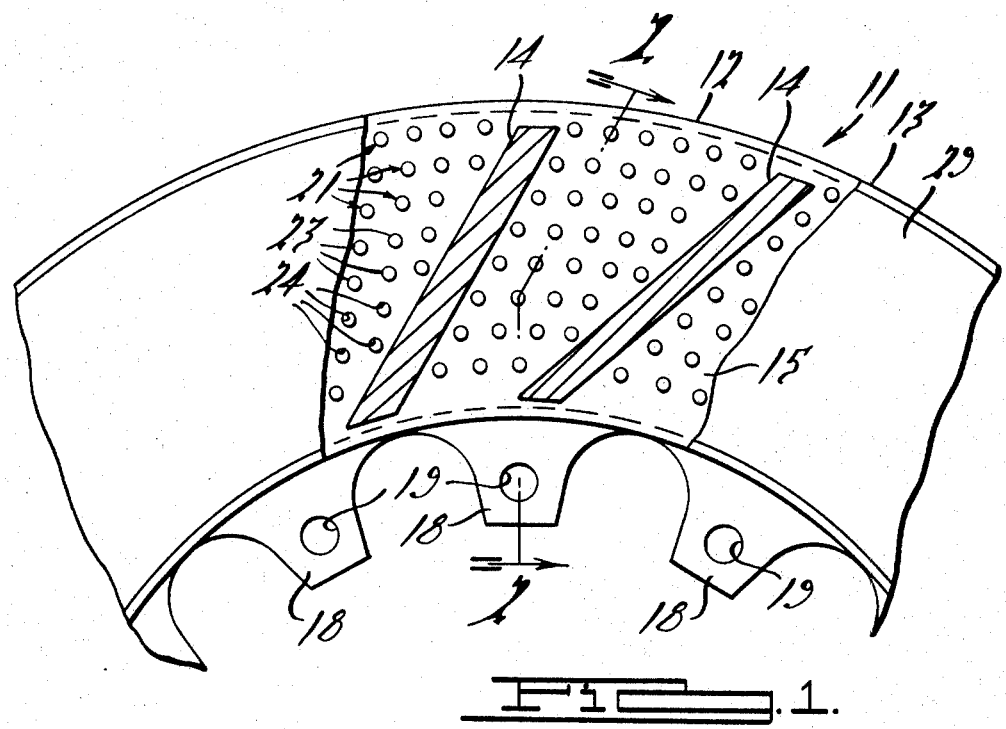
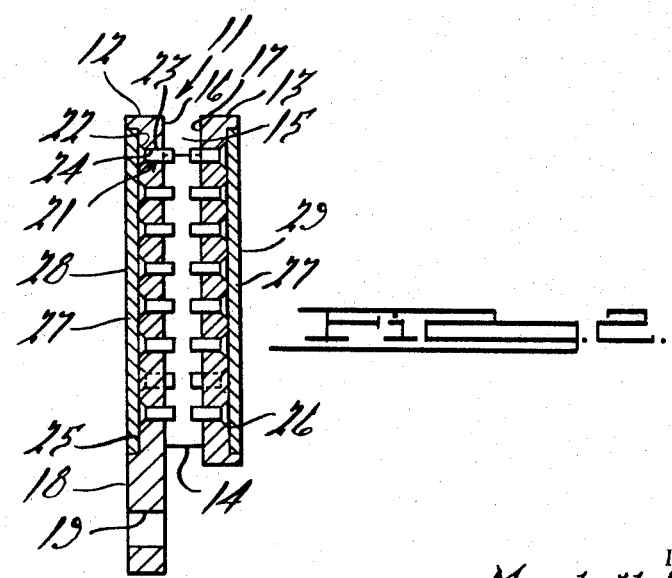
INVENTOR.
Marshall L. Severson
BY
Harness, Dickey & Pierce
ATTORNEYS

United States Patent Office 3,391,763
Patented July 9, 1968

3,391,763
BRAKE DISK
Marshall L. Severson, Birmingham, Mich., assignor to Kelsey-Hayes Company, a corporation of Delaware
Filed Feb. 14, 1967, Ser. No. 616,013
5 Claims. (Cl. 188—218)

ABSTRACT OF THE DISCLOSURE

This application discloses a brake disk wherein the surface of the disk engaged by the friction pad is coated with a highly conductive copper, silicon carbide composition that provides a cooler contact temperature, stabilized friction coefficient and improved fade performance. In addition, the aforenoted braking characteristics are further improved by providing a plurality of rod shaped heat transfer elements having a high coefficient of thermal conductivity in thermal contact at one of their ends with the braking surface. A substantial area of these elements is exposed to the atmosphere for rapid dissipation of the heat generated by the braking.

The background of the invention

This invention relates to the art of disk brakes and more particularly to a brake rotor or disk having improved high temperature performance.

A common problem associated with brake operation is the dissipation of the heat generated from the translation of the rotational energy into heat energy. Disk type brakes have certain advantages over drum type brakes in regard to heat dissipation, but this problem is still present in disk type brakes, particularly when associated with heavy, high speed vehicles. The thermal stresses subjected to the disk brake rotor create several problems. For example, steels and irons normally used for brake disks may undergo a phase change at braking temperatures with attendant volume change and display checking or cracking when subjected to this heat. In addition, frictional coefficient can decrease with an attendant decrease in brake efficiency.

It is, therefore, a principal object of this invention to provide a disk brake rotor that will rapidly dissipate heat.

It is a further object of this invention to provide a disk brake rotor that can withstand high temperatures but will nevertheless effectively dissipate heat.

It is another object of this invention to provide a material particularly adapted for use on the frictional surface of the disk brake rotor that is able to withstand high temperatures without extreme degradation of the frictional coefficient and which is adapted to readily dissipate heat because of its high thermal conductivity.

Brief summary of the invention

A disk brake rotor embodying this invention is particularly adapted to be affixed for rotation with a wheel of a motor vehicle or like object to be braked. The disk has a peripheral surface positioned adjacent a cooperating braking pad that is fixed against rotation but supported for relative movement toward and away from the disk surface. The area of the disk surface engaged by the pad is covered with a cooper-silicon carbide composition.

A further feature of the invention relates to a structure for rapidly dissipating heat from a rotor of a disk brake assembly. In this connection, a plurality of heat transfer elements are carried by the disk and are formed from a material having a substantially higher coefficient of thermal conductivity than the disk. One end of these heat transfer elements is positioned in thermal contact with the frictional surface of the disk; and the elements have a substantial portion of their area disposed in the atmosphere surrounding the disk for rapidly dissipating the heat generated by braking from the surface to the atmosphere.

Brief description of the drawings

FIGURE 1 is a side elevational view, with portions broken away, of a segment of a disk brake rotor embodying this invention.

FIGURE 2 is a cross-sectional view taken along the line 2—2 of FIGURE 1.

Detailed description of the preferred embodiments of the invention

In the drawings, the reference numeral 11 indicates a segment of a rotor or disk for a disk brake embodying this invention. The rotor 11 may be used with any known type of disk braking apparatus, for example, one of the type shown in United States Letters Patent No. 2,915,147, entitled, "Disk Brake for Vehicles," issued to John W. Davis on Dec. 1, 1959.

The rotor 11 is comprised of a pair of spaced annular members 12 and 13 that are integrally joined together at spaced circumferential points by spacers 14 to define an air gap 15 between the inner faces 16 and 17 of the members 12 and 13, respectively. The air gap 15 facilitates cooling of the braking surfaces, as will become more apparent as this description proceeds. The spacers 14 are offset at an acute angle from radial planes within the air gap 15 so as to act as fan blades for forcing air through the air gap 15 as the rotor 11 rotates.

The member 12 is formed with integral, inwardly extending projections 18 at circumferentially spaced locations, each of which is formed with a cylindrical opening 19. The openings 19 serve to pass bolts, rivets or other like fastening elements whereby the rotor 11 may be affixed for rotation to a wheel to be braked, a wheel supporting hub or any other rotating member.

The members 12 and 13 and spacer members 14 are conveniently formed as an integral one piece casting. Previously, ferritic steels or cast irons have been employed as materials for such brake rotors. These steels and cast irons are subject to heat checking and cracking due to the thermal expansion and contraction generated by the heat of braking. Also, since the brake temperatures can exceed thirteen hundred thirty degrees Fahrenheit (1330° F.), the ferritic steels experience a phase change during their life. At this temperature the material undergoes a phase change from body centered to face centered cubic. In order to avoid this phase change and the heat cracking and checking, a special alloy is employed for the members 12, 13 and 14. This steel is an austenitic steel at room temperature such as Carpenter Steel alloy A-286.

Although the use of such austenitic steels as rotor material has the advantage of being able to avoid the stresses of a phase change, these steels have a thermal conductivity that may be only one-half the thermal conductivity of ferritic steels. Thus, to facilitate heat transfer from the braking surface, a plurality of heat transfer elements, indicated generally by the reference numeral 21, are provided. The heat transfer elements 21 are formed from copper or some other material having a substantially higher coefficient of thermal conductivity than the material of the rotor and particularly that from which the members 12 and 13 are formed. The elements 21 have generally tapered headed portions 22 and cylindrical portions 23 that are received within bores 24 formed in each of the rotor elements 12 and 13. A substantial portion of the cylindrical portion 23 of each element 21 extends into the air gap 15 so as to promote heat transfer. In order to further aid in the heat dissipation, the heat transfer elements 21 are disposed in rows with the axes of the elements in each row disposed in substantially parallel relationship to the spacers 14 as clearly shown in FIGURE 1.

The surface adjacent the brake pads (not shown) of each of the rotor members 12 and 13 is provided with a respective annular cutout portion 25 and 26, each having a depth of approximately nine one-hundredths (0.09) inch. A coating material 27 is disposed into each of the recesses 25 and 26 which coating material has a high coefficient of thermal conductivity and tends to have a more stable friction coefficient as its temperature increases. The material 27 is a thick coat of silicon carbide in a matrix of copper that is deposited in the recesses 25 and 26 by a flame spray technique of any known type. In order to aid in the adhesion of the material 27 to the rotor members 12 and 13 a relatively thin coating of molybdenum is deposited in each of the recesses 25 and 26 by a flame spray technique of any known type prior to the deposit of the material 27. The molybdenum coating forms a good adhesive bond with the material of the rotor members 12 and 13 and the coating material 27 forms a good adhesive bond with the molybdenum. The enlarged heads 22 of the heat transfer elements 21 are in direct thermal contact with the material 27 through the molybdenum so as to further facilitate the heat transfer from the surfaces 28 and 29 of the material 27 that is engaged by the brake disks during braking.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A rotor for a disk brake assembly comprising a rotor disk adapted to be affixed for rotation with a wheel or like object to be braked, said disk having a peripheral surface adapted to be frictionally engaged by a cooperating brake pad, and a plurality of heat transfer elements formed from a material having a substantially higher coefficient of thermal conductivity than said disk, each of said heat transfer elements having a substantially cylindrical segment disposed in the atmosphere and an enlarged area head portion juxtaposed to the peripheral surface of the disk engaged by the friction pad for thermal contact of said enlarged area head portions with said surface, a substantial area of said cylindrical segments of said heat transfer elements being disposed to the air surrounding said disk for rapidly dissipating the heat generated by braking from said surface to the atmosphere.

2. A rotor as set forth in claim 1 wherein the disk is formed from an austenitic steel having such characteristics at room temperature for precluding a phase change under the temperatures experienced during braking and a coating on said peripheral surface, said coating being formed from a material having a high coefficient of thermal conductivity and having a relatively stable friction coefficient at the temperatures encountered during brake operation.

3. A rotor as set forth in claim 2 wherein the head portions of the heat transfer elements are in direct contact with the coating.

4. A rotor for a disk brake assembly, said rotor providing means for attachment of said rotor to a wheel or like object to be braked, said rotor further defining a generally planar annular surface adapted to be disposed adjacent a cooperating brake pad, said rotor being formed from an austenitic steel having such characteristics at room temperature to preclude a phase change in said steel under the temperatures experienced during braking, and a coating upon the annular surface of said disk and adapted to be engaged by the coperating brake pad for braking the associated wheel, said coating comprising a copper silicon carbide composition.

5. A rotor for a disk brake as set forth in claim 4 further including a plurality of heat transfer elements affixed to the disk, each of said heat transfer elements having a substantially higher coefficient of thermal conductivity than the steel from which the disk is made, each of said heat transfer elements being in thermal contact at one end thereof with said coating and having a substantial portion of its surface area disposed in the atmosphere for rapidly dissipating heat from said coating to the atmosphere.

References Cited

UNITED STATES PATENTS

| 880,266   | 2/1908  | Ast.          |
|-----------|---------|---------------|
| 2,255,024 | 9/1941  | Eksergian.    |
| 2,627,325 | 2/1953  | Helsten.      |
| 2,775,323 | 12/1956 | English.      |
| 3,033,326 | 5/1962  | Byers.        |
| 3,036,017 | 5/1962  | Schrewelius.  |
| 3,184,001 | 5/1965  | Reinsch et al.|

OTHER REFERENCES

The Making, Shaping and Treating of Steel, 7th ed. Pittsburgh, Pa., United States Steel Corp., 1957, pp. 855 and 870. Copy in Group 110.

MILTON BUCHLER, *Primary Examiner.*

G. E. A. HALVOSA, *Assistant Examiner.*